United States Patent
Belmans et al.

(10) Patent No.: US 9,454,842 B2
(45) Date of Patent: Sep. 27, 2016

(54) PARTITION OF A 3D SCENE INTO A PLURALITY OF ZONES PROCESSED BY A COMPUTING RESOURCE

(71) Applicant: Dassault Systemes, Velizy Villacoublay (FR)

(72) Inventors: Philippe Belmans, Paris (FR); Malika Boulkenafed, Courbevoie (FR)

(73) Assignee: Dassault Systemes, Velizy Villacoublay (FR)

( * ) Notice: Subject to any disclaimer, the term of this patent is extended or adjusted under 35 U.S.C. 154(b) by 337 days.

(21) Appl. No.: 14/107,984

(22) Filed: Dec. 16, 2013

(65) Prior Publication Data
US 2014/0176552 A1    Jun. 26, 2014

(30) Foreign Application Priority Data
Dec. 21, 2012    (EP) .................................. 12306654

(51) Int. Cl.
G06T 15/08    (2011.01)
A63F 13/30    (2014.01)

(52) U.S. Cl.
CPC .............. *G06T 15/08* (2013.01); *A63F 13/12* (2013.01); *A63F 2300/531* (2013.01); *A63F 2300/534* (2013.01); *A63F 2300/535* (2013.01)

(58) Field of Classification Search
None
See application file for complete search history.

(56) References Cited

U.S. PATENT DOCUMENTS

| | | | | |
|---|---|---|---|---|
| 5,864,342 A * | 1/1999 | Kajiya | ................... | G06T 11/001 |
| | | | | 345/418 |
| 6,767,287 B1 * | 7/2004 | Mcquaid | ................. | A63F 13/12 |
| | | | | 463/29 |
| 2007/0094325 A1 * | 4/2007 | Ih | ............................. | A63F 13/12 |
| | | | | 709/203 |
| 2008/0104609 A1 * | 5/2008 | D'Amora | ............... | G06N 3/006 |
| | | | | 718/106 |
| 2009/0144638 A1 | 6/2009 | Haggar | | |
| 2010/0087257 A1 * | 4/2010 | Deb | ........................ | G06N 3/006 |
| | | | | 463/43 |
| 2010/0113159 A1 * | 5/2010 | Chapman | ................... | A63F 3/04 |
| | | | | 463/42 |

OTHER PUBLICATIONS

John C. S. Liu, et al., An Efficient Partitioning Algorithm for Distributed Virtual Environment Systems, IEEE Transactions on Parallel and Distributed Systems, IEEE Service Center, Los Alamitos, CA, US, vol. 13, No. 3, Mar. 1, 2002, p. 193, EP011094306.

European Search Report for Application No. 12 30 6654, dated May 8, 2013.

* cited by examiner

Primary Examiner — Kee M Tung
Assistant Examiner — Xin Sheng
(74) Attorney, Agent, or Firm — Hamilton, Brook, Smith & Reynolds, P.C.

(57) ABSTRACT

The invention is directed to a computer-implemented method for partitioning a three-dimensional scene into a plurality of zones, each zone being processed by a computing resource. The method comprises
  providing a three-dimensional scene comprising one or more objects, each object generating a computing resource cost;
  determining a set of locations in the three-dimensional scene;
  filling each location with its maximum occupancy of objects that reaches the most expensive computing cost;
  computing, for each location of the three-dimensional scene, the maximum computing cost density; and
  grouping adjacent locations into one or more zones, each zone having a resulting computing cost density guarantying a real-time performance of the zone.

18 Claims, 4 Drawing Sheets

PARTITION OF A 3D SCENE INTO A PLURALITY OF ZONES PROCESSED BY A COMPUTING RESOURCE

RELATED APPLICATION(S)

This application claims priority under 35 U.S.C. §119 or 365 to European, Application No. 12306654.0, filed Dec. 21, 2012.

The entire teachings of the above application(s) are incorporated herein by reference.

FIELD OF THE INVENTION

The invention relates to the field of computer programs and systems, and more specifically to a method, system and program for partitioning a three-dimensional scene into a plurality of zones, each zone being processed by a computing resource.

BACKGROUND OF THE INVENTION

Massively Multi-user On line applications (MMOs) allow a large number of users to simultaneously use an application such as real-world phenomena simulator, immersive applications, and so on. Similarly, Massively Multi-user On line Games (MMOG) allow a large number of gamers to play simultaneous a video game. MMOs and MMOGs notably rely on computer networks, e.g. the Internet, for allowing the users or gamers to connect to the applications or video games. Throughout this specification the word "application" and "video games" will be understood as to be synonymous, and the terms MMO and MMOG will be indifferently used.

MMOs involve a complex and large virtual environments which are desired to be rendered in as much detail as possible, in as close to real time as possible, in order to provide users or game players with a more realistic experience. MMOs are specifically designed for the representation and the manipulation of 3D scenes, and are typically utilized on the end-user's computer for applications that require interactive, sequential, real-time 3D scene generation. As the user interacts with the 3D scene, the computer redraws the 3D representation rapidly enough to convey to the user the sense of a continuous, ongoing reality in which the user is participating. The scene is composed of many separate objects that can be manipulated by user when interacting with the 3D scene. Thus, MMOs involve large data volumes, high data rates and high data complexity is generally required in order to manage large numbers of users participating in real time in a spatially complex and highly detailed virtual environment.

MMOs are typically used for simulating real-world phenomena within computer models; for instance Multi-Body Rigid Dynamics, Human Simulation, Cloth Simulation, Particle Simulation. Simulations require accurate data and algorithms that describe real-world phenomena, such as the physical properties (strength, elasticity, etc.) of the materials used in a manufacturing process and the product to create a simulation of the process and a simulation of a product in use. 3D CAD/CAM (Computer Aided Design, Computer Aided Manufacturing) tools allow to create 3D representations of the product or component parts.

The main and critical requirement of MMOs and MMOGs is to offer a real-time response at anytime to the connected players, regardless of their number, and regardless of the induced computation costs for solving and rendering of the application. Otherwise, the quality of play experience turns poor, decreasing players' interest for the application, limiting interaction when performing collaborative and distributed design review.

MMO's, just like MMOG's, must be scalable to dynamically adapt to the perpetually changing work-load, maintaining thus real-time performance. Scalability notably comprises the number of users that can simultaneously use the application, the number of computing resources for computing the simulations, the number of simultaneous interactions between objects of the 3D scene allowed by the application, and so on. For MMOG's, the number of users may vary significantly, as well as the positional and graphical attributes of all contained dynamic objects. Nevertheless, the surrounding scenery is set once for all and the typology of dynamic objects and the supported behavior classes are predefined, before the game starts. Said otherwise, 3D scenes in MMOGs comprise a number of predetermined characteristics that strongly limit the needs of computing resources; thus improving scalability.

On the contrary, for advanced MMOs, the scenery and population typology of the 3D scene can evolve and enrich, especially while application is running. Indeed, MMOs aim at real-world phenomena, wherein the behaviour of objects is dynamic and excludes predefined behavior classes. Consequently, 3D scenery in MMOs cannot use predefined characteristics as for MMOGs.

The issue of scalability is addressed by MMOG. Such solutions and techniques include Sharding and Zoning. Sharding consists in cloning the world (partially or entirely) and host newly logged users to cope with the workload rise, but with no possible interaction between shards. So by nature, Sharding cannot support unlimited expansion of the virtual world space and population: shards have indeed a physical capacity ceiling dictated by the performance of their assigned processing resources.

Zoning relies on a partition of the virtual world space in so called zones, each of them under the responsibility of a computing resource. Objects/users can navigate from zone to zone. Associated computing resources communicate then dedicated messages on a network to integrate these moving objects in their computational models.

However, in MMOGs, zones evolve quite independently from one another: dynamic objects are simply "teleported" from one of few predefined passage locations of zone "A" to another of few of zone "B". The issue of optimal load balancing is solved by fencing zones with obstacles or solid walls, by limiting the number of inter-zone passage locations, by limiting the population of objects within each zone at anytime, and by filling the zones with adjusted static décor. In a way, the different regions of the virtual environment are customized to fit the real-time requirements.

For advanced MMO's, this simplification is not acceptable. Indeed, a virtual environment, especially when real-world phenomena are simulated, cannot support an artificial fencing of the scenery which limits possibilities of customizations of the simulated real-world. On the contrary, in the real-world, zones are open, share common continuous borders with their neighbor zones, where potentially any object can pass thru. Thus, by its nature, zoning can manage potentially unbounded augmentation of the virtual world as required in advanced MMO's. However, the zoning as performed in MMOGs is not adapted to the context of MMOs because it requires ad-hoc customization of the virtual environment, the simulated real-world, and restrictions on its characteristics.

Within this context, there is still a need for an improved method, computer program, and system providing a scalable, seamless, and effective real-time simulation of a 3D scene in real-world simulation applications.

SUMMARY OF THE INVENTION

According to one aspect, the invention therefore provides a computer-implemented method for partitioning a three-dimensional scene into a plurality of zones, each zone being processed by a computing resource. The method comprises:
- providing a three-dimensional scene comprising one or more objects, each object generating a computing resource cost;
- determining a set of locations in the three-dimensional scene;
- filling each location with its maximum occupancy of objects that reaches the most expensive computing cost;
- computing, for each location of the three-dimensional scene, the maximum computing cost density; and
- grouping adjacent locations into one or more zones, each zone having a resulting computing cost density guarantying a real-time performance of the zone.

The method may comprise one or more of the following:
- aggregating the maximum computing cost densities computed for the locations of the three-dimensional scene, and building a map of cost density of the three-dimensional scene from the aggregated maximum computing cost densities;
- the step of filling each location with its maximum occupancy of objects is performed for dynamic objects, a dynamic object being an object that can potentially move in the three-dimensional scene;
- extracting, for each location of the three-dimensional scene, static objects located on said each location, an static object being an object that cannot move in the three-dimensional scene and that cannot be traversed by another object, and building a map of constraints of the three-dimensional scene from the extracted static objects;
- the step of extracting the static objects further comprises extracting, for each location of the three-dimensional scene, a print of the static objects on said each location of the three-dimensional scene;
- a step of aggregating the maps of cost density of the three-dimensional scene and constraints of the three-dimensional scene;
- computing the maximum computing cost density comprises computing a ratio P/A, wherein P is a measured percentage of a computing resource required for processing the location and A is an area of the location in the three-dimensional scene;
- at the step of grouping, the resulting computing cost density of each zone is such that the computing resource required for processing the zone is under a predefined threshold;
- at the step of grouping, the resulting computing cost density between two or more zones is sensibly the same;
- the step of grouping is further performed taking into account the use of the computing resource made in the past by each zone.

The invention further proposes a computer program comprising instructions for execution by a computer, the instructions being adapted for performing the steps of the method of the invention.

The invention further proposes a computer readable storage medium having recorded thereon the above computer program.

The invention further proposes a computerized system comprising:
- a storage system for storing a three-dimensional scene comprising one or more objects;
- a processing unit for processing a plurality of zones partitioning a three-dimensional scene, each zone being processed by a computing resource of the processing unit, the processing unit being adapted for partitioning the three-dimensional scene into a plurality of zones according to the method of the invention.

BRIEF DESCRIPTION OF THE DRAWINGS

Embodiments of the invention will now be described, by way of non-limiting example, and in reference to the accompanying drawings, where.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figures 1, 2:
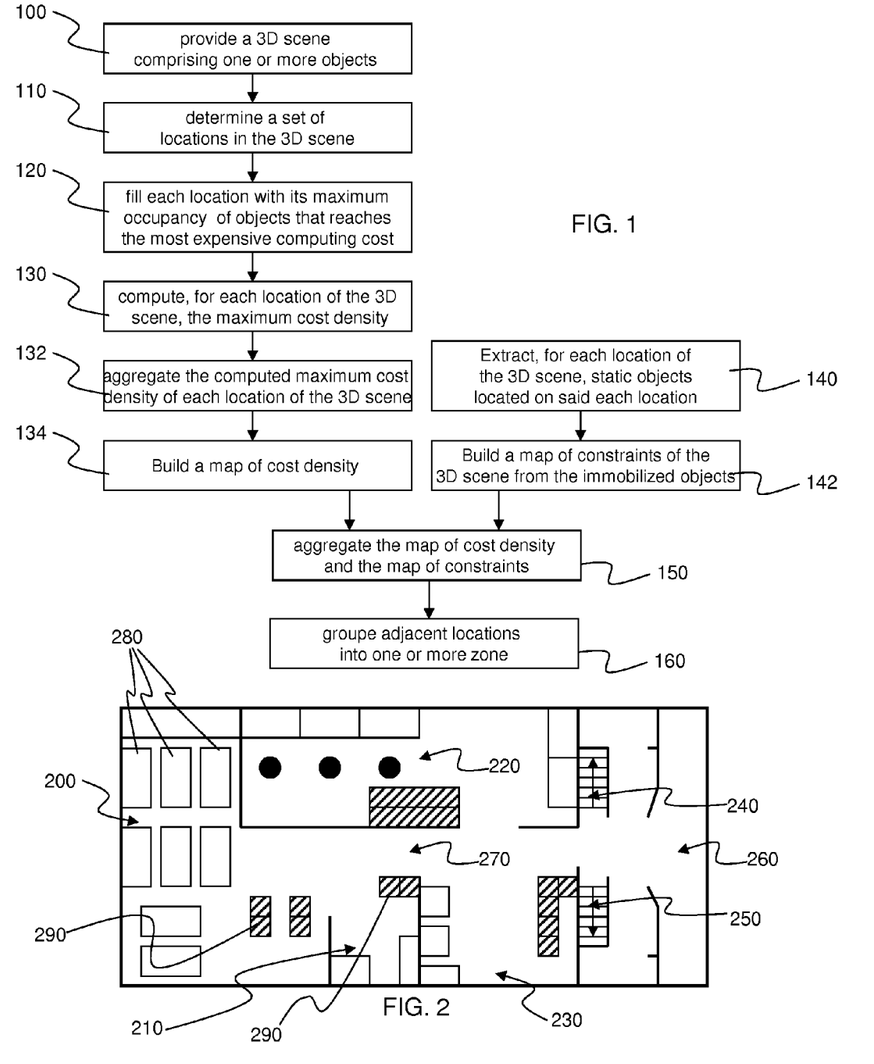
FIG. 1 shows a flowchart of an example of the method.
FIG. 2 shows a top view of an example of a virtual world of a shopping mall.

With reference to the flowchart of FIG. 1, it is proposed a computer-implemented method for partitioning a three-dimensional scene into a plurality of zones, each zone being processed by a computing resource. The process comprises providing a three-dimensional (3D) scene. The 3D scene may simulate a real-world environment. The 3D scene comprises one or more objects, e.g. 3D modeled objects. Each object generates a computing resource cost, that is, each object requires a time of a computation resource in order to the executed in the 3D scene. The method further comprises the determination of a set of locations in the 3D scene. A location in the 3D scene may be an area accessible to an object of the 3D scene. A location in the 3D scene may be a volume wherein an object of the 3D scene may be encompassed. The method further comprises filling each location with its maximum occupancy of objects that reaches the most expensive computing cost. The method further comprises computing, for each location of the 3D scene, the maximum computing cost density. The maximum computing cost density may refer to the computing cost per area unit or per volume unit. The method also comprises grouping adjacent locations into one or more zones. Each zone has a resulting computing cost density guarantying a real-time performance of the zone. The resulting computing cost density of a zone is the sum of the maximum cost density of each location multiplied by its area or volume.

Such a method improves the zoning of a 3D scene wherein the guaranty real-time performance is provided, without imposing ad-hoc customization of the 3D scene or restrictions on its characteristics. In addition, the present method supports further extensions of the 3D scene, extensions of the object typology, and of its behavior classes. Indeed, the grouping depends on the result of the saturation of each location of the 3D scene performed by filling each location with its maximum occupancy of objects that reaches the most expensive computing cost. Interestingly, the maximum occupancy of objects reflects realistic conditions of the 3D scene. Said otherwise, the grouping is the result of a scenario wherein the population of objects on each location is maximal, the scenario being realistic with regard to the simulated real-world.

The method is computer-implemented. This means that the steps (or substantially all the steps) of the method are executed by at least one computer or a computerized system. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the step of providing a 3D scene comprising one or more objects may be performed upon user selection, e.g. of a scene. The user may carry out the selection via a haptic device such as a keyboard, a mouse, a stylus, or the like. For instance, in a two-button mouse, the left button could be used for selecting the scene in a list of scenes. The system may also identify by default a scene, i.e. without requiring user selection.

A typical example of computer-implementation of the method is to perform the method with a system comprising a memory and a processor. The memory, which stores a database, is merely any hardware suitable for such storage. The processor may also be referred to as a computing unit. Such a system provides a scalable, seamless, and effective real-time simulation of a 3D scene in the context of real-world simulation applications. The system may further comprise a graphical user interface (GUI) suitable for displaying a 3D scene and objects within the 3D scene. The GUI is coupled with the memory and the processor.

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the case of the method, the database comprises a three-dimensional scene comprising one or more objects. The one or more objects are stored on the database, and may be stored independently from the scene. The database may further comprise a computer program comprising instructions for execution by the system. The instructions are adapted for performing the steps of the present method.

The method generally manipulates objects. An object is any object defined by data stored in the database. By extension, the expression "object" designates the data itself. According to the type of the system, the objects may be defined by different kinds of data. The system may be any combination of a CAD system, a CAE system, a CAM system, and/or a PLM system. In those different systems, modeled objects are defined by corresponding data. One may accordingly speak of CAD object, PLM object, CAE object, CAM object, CAD data, PLM data, CAM data, CAE data. However, these systems are not exclusive one of the other, as an object may be defined by data corresponding to any combination of these systems. A system may thus well be both a CAD and PLM system, as will be apparent from the definitions of such systems provided below. The system may be also MMO or MMOG system wherein objects are manipulated upon user action.

By CAD system, it is meant any system suitable at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round etc.) and/or standard surfacing features (e.g. sweep, blend, loft, fill, deform, smoothing and/or etc.). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is meant any system suitable for the management of a modeled object representing a physical manufactured product. In a PLM system, a modeled object is thus defined by data suitable for the manufacturing of a physical object. These may typically be dimension values and/or tolerance values. For a correct manufacturing of an object, it is indeed better to have such values.

By CAE system, it is meant any system suitable for the analysis of the physical behaviour of a modeled object. In a CAE system, a modeled object is thus defined by data suitable for the analysis of such behaviour. This may be typically a set of behaving features. For instance, a modeled object corresponding to a door may be defined by data indicating that the door rotates around an axis.

Figure 8:
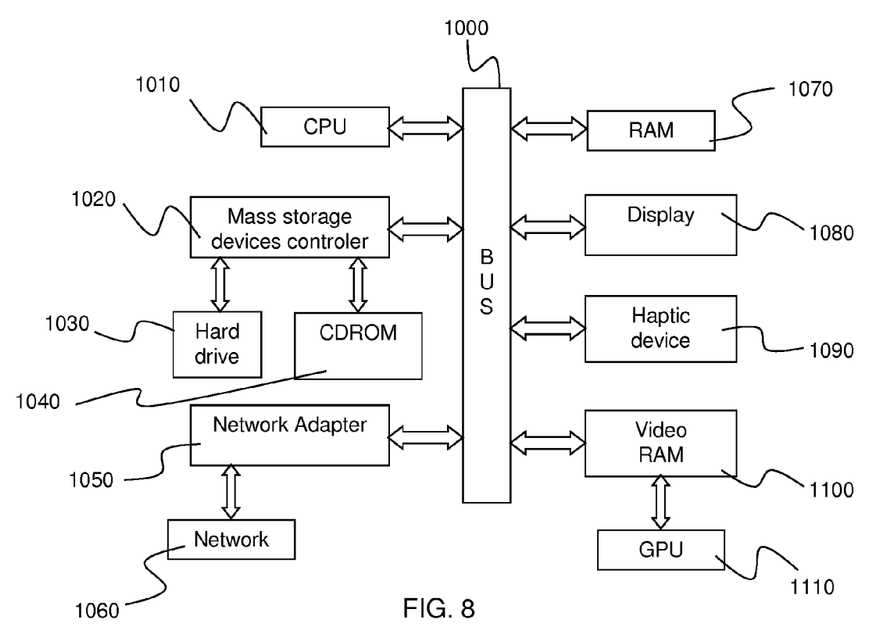
FIG. 8 shows an example of a computerized system.

FIG. 8 shows an example of a client computer system, e.g. a workstation of a user.

The client computer comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals.

A computer program may comprise instructions by a computer, the instructions comprising means for causing the above system to perform the above method. The invention may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

In reference to the flowchart of FIG. 1, it is now discussed an example of the method for partitioning a three-dimensional scene into a plurality of zones.

At step 100, it is provided a three-dimensional (3D) scene that comprises one or more objects. Providing the 3D scene may comprise displaying the 3D scene and the one or more objects on a display, for instance the display 1080 mentioned with reference to FIG. 2. A 3D scene is a space in which spatial relationships between objects are described. The scene is comprised of at least two objects, and the objects may be, but not limited to, modeled objects or 3D modeled objects. A 3D modeled object is a description of an object in a 3D space. A 3D scene is a model of a physical universe, which may be mathematically represented by a geometry which describes every point in 3D space by means of coordinates. The 3D scene is typically a real-world simulated wherein realistic interactions between the objects are simulated. The expression realistic interactions means that the simulated interactions reflects the interactions of the real-world, e.g. physical laws such that forces/efforts (gravity, magnetism, contact), control laws such that information flow, control events . . . . The one or more objects evolve in the 3D scene and are subject to the laws of the simulated real-world, e.g. two objects cannot intersect each other. The 3D scene comprises a layout that can be modified for the purpose of specific scenarios. A scenario describes at least foreseeable interactions of the one or more objects in the 3D scene. The scenario thus describes one way that the 3D scene is or is envisaged to be used in the context of an activity, such as analyzing the impact of a new section in a store on the flow management of customers, or on the safety in case of fire evacuation. Each specific scenario will be simulated on the layout. It is to be understood that the scenario may be defined by the user. In practice, the layout of the 3D scene is comprised of static objects that cannot move in the 3D scene and that cannot be traversed by another object.

FIG. 2 illustrates an example of the top view of a 3D scene which simulates a virtual world of a shopping mall. This virtual mall consists of several shops 200, 210, 220, 230, hallways 260, 270 and stairways 240, 250 separated by walls (represented by thick lines). The shops contain shelves 280, cash registers 290 and others equipments. In FIG. 2, the layout of the 3D scene is comprised of static objects such as the ground of the hallways, the stairways, the walls, the shelves. Other objects of the 3D scene such as the cash register are not part of the layout because these objects are not static objects: indeed, a cash register is an object that can be moved, unless the cash register is designed to be part of the layout and thus an static object.

Next, at step 110 in FIG. 1, a set of locations is determined in the 3D scene, which amounts to say that two or more locations are identified in the 3D scene. Alternatively, only one location may be determined. A location is a part of the 3D scene that is reachable by an object of the 3D scene.

Typically, a location of the 3D scene is reachable by a dynamic object. A dynamic object is an object that can potentially move in the 3D scene. A dynamic object is thus opposed to static object that never moves in the 3D scene and that cannot be traversed by another object. The term location may designate a delimited area of the 3D scene accessible to an object of the 3D scene, or may also designate a volume of the 3D scene wherein an object of the 3D scene is encompassed. Said otherwise, a location may be a site in the 3D scene occupied or available for occupancy by one or more objects.

Back to the 3D scene shown in FIG. 2, customers (not shown) are simulated by objects. The customers can walk, browse, pick goods displayed on the shelves and put them in their shopping carts. It is to be understood that the goods (not shown) are also objects. These customers and the goods are dynamic objects, that is, objects that can potentially move in the 3D scene. Here, the list of dynamic objects and of possible actions is not extensive and depends on the purpose the application and on the nature of supported scenarios by the 3D scene. The 3D scene represented on FIG. 2 is permanently running or processed by computing resources. This involves that, meanwhile, users log in/out at anytime, new shops are built in the mall and start business, new equipments like a lift can be added and new merchandise can be introduced. In other words, the layout can be modified and the dynamic objects may also be modified; for instance, customers may be suppressed, added, or even modified.

The 3D scene may thus be contemplated as comprising a layout of static objects and a set of dynamic object moving/evolving in said layout. Interestingly, locations and static objects are closely related. Indeed, movements of dynamic objects within the layout are limited by the static objects that defining surfaces or volumes in the 3D space that cannot be traversed by dynamic objects. For instance, in FIG. 3, objects representing a customer 34 and a shopping cart 35 are dynamic objects that move in a hallway 33 (referred to as hallway 270, 280 in FIG. 2) which is a static object. The ground of the hallway 33 is reachable by dynamic objects, and can therefore be identified as a location. As another example, the objects representing cans in stacks 32 are dynamic objects that can potentially be moved (for instance, they can be grabbed by a customer and put in a shopping cart) from one of the shelf 31. The shelves 31 of the display case 30 can therefore be determined as being locations.

Referring back to FIG. 1, at step 120, each location previously determined is filled with its maximum occupancy of objects that reaches the most expensive computing cost. Filling a location with its maximum occupancy of objects means that objects are placed on the location, and that the number of objects placed on this location is the maximum number of objects allowed on the location. This maximum number of objects is a characteristic of the location, and that characteristic may be defined by the scenario that is played or applied on the 3D scene. The scenario is realistic with regard to the simulated real-world and limits the possible actions of objects in the 3D scene.

The one or more objects on the 3D scene are instantiated objects, as known in the art. An object generates a computing cost when it is instantiated in the 3D scene. The computing cost of an instantiated object is a function of the parameters of the instantiation. These parameters of the instantiation may be, but not limited to, the selected complexity of the 3D mesh of the object, the precision of the textures, reflection and shading of the object in the 3D scene, properties associated to dynamical behavioral such that contact/collision, elasticity, heat transfer . . . . It is to be understood that the generated computing cost is maximum when the instantiation parameters are maximal (e.g. instantiation with a maximal realism) for a maximum number of objects on a location.

Figure 3:
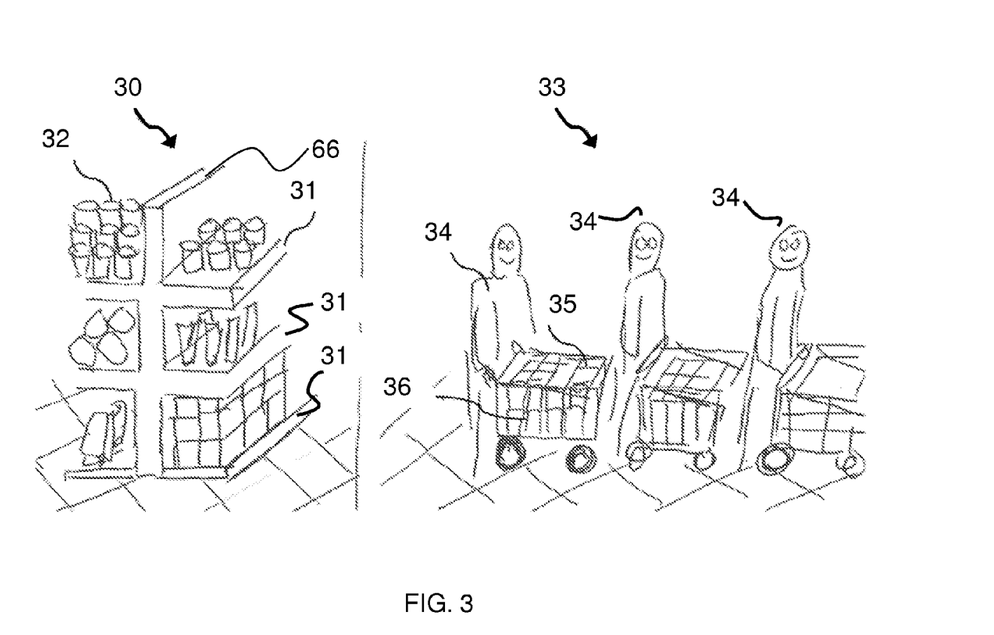
FIG. 3 shows an example of an analysis of a maximum cost density of a location.

In reference to FIG. 2, goods may be placed on the shelves 280 in the shop 200. For instance, the goods may be shampoo bottles and a shelf may be a location. As the 3D scene plays a real world simulation scenario, the shelf may support a maximum number of shampoo bottles instantiated with a maximal realism so that the most expensive computing cost is obtained for this shelf. This situation is shown in FIG. 3. The display case 30 comprises six shelves 31. The display case 30 is shown in its maximum cost situation with biggest allowed shelves (31), each of them at their maximum capacities of cans in stacks (32), with most CPU expensive cans with complex 3D meshes and rich textures for rendering.

Still in reference to FIG. 2, and as another example, objects may be placed on the hallway 270. For instance, the objects may be users carrying a shopping basket. Again, as the 3D scene plays a real world simulation scenario, the hallway may comprise a maximum number of users carrying a shopping basket that generate the most expensive computing cost for the shelf. This is illustrated on FIG. 3 showing a location, here an hallway 33 (referred to as hallway 270, 280 in FIG. 2) that is in the maximum cost situation, when each customer 34 is pushing a shopping cart 35 that is full of items 36, each customer and its cart being a "bumper to bumper" situation; that is, the "bumper to bumper" situation is the worse situation wherein the hallway 33 comprises a maximum number of customers. It is to be understood that the objects (user, carts, and items) are instantiated with parameters instantiation that are selected for generating the maximum cost of computation resources; for instance, the rendering parameters are selected for obtaining the most precise representations of the objects.

Advantageously, the step 120 may be performed for dynamic objects only, that is, for objects that can potentially move in the 3D scene. Indeed, dynamic objects have an unpredictable computing cost because their computing cost is depends on factors such as their number, the detail of their rendering. On the contrary, static, that is, objects that cannot move in the 3D scene and that cannot be traversed by another object, generate a predictable computing cost of the computing resource, or said otherwise, their computing resource costs can be known in advance.

Thus, at step 120, the most expensive computing cost for a given location is reached when the maximum number of objects acceptable on the location is reached and when the objects are instantiated at least with a maximal realism. Hence, a maximum cost situation analysis is performed: each location of the virtual world is analysed in its maximum CPU cost situation.

Next, at step 130, it is computed the maximum computing cost density of each location of the 3D scene. This advantageously allows quantifying and characterizing the worst cost situations for all locations performed at the step 120. The computing is performed for each location filled at step 120.

The maximum computing cost density may refer to the computing cost per area unit or per volume unit, depending on the location's type (an area, a volume). For instance, if the location is an area, then the maximum computing cost density will be the computing cost per area unit; as another example, if the location is a volume, the maximum computing cost density will be the computing cost per volume unit. It is noticeable that the maximum computing cost density can include the nature of the 3D object. This amounts to say that the maximum computing cost density may be computed according to the nature of the 3D object on said area or volume unit. For instance, for a same area, the maximum computing cost density may depends on whether basic 3D objects such as cubes, spheres, . . . , or complex ones such as surfaces, meshes, . . . , are simulated.

In practice, the computing step 130 comprises computing a ratio P/A, wherein P is a measured percentage of a computing resource required for processing the location that reaches its most expensive computing cost, as discussed in reference to step 120, and wherein A is the area of the location in the three-dimensional scene. Alternatively, A may be the volume of the location in the three-dimensional scene. The computing resource P is typically the processor of the system implementing the present method, or a computing resource processing a zone.

Figure 4:
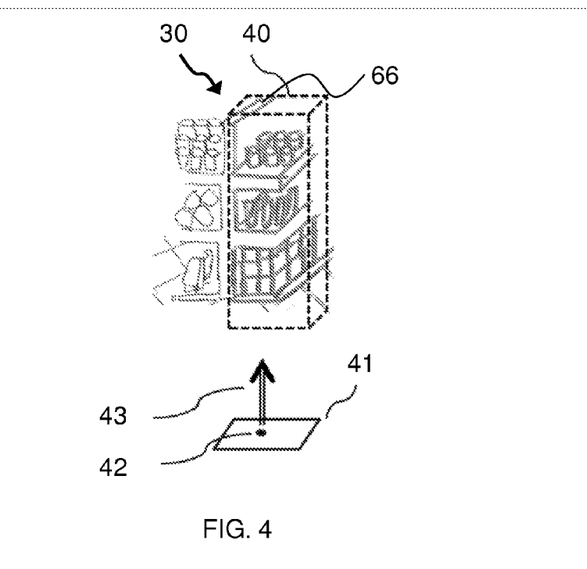
FIG. 4 shows an example of a quantification of a maximum cost density of a location.

Referring now to FIG. 4, it is illustrated the computing of the maximum computing cost density of shelves in a shopping mall as depicted in reference to FIG. 2. In FIG. 4, the determined location 40 is a volume that comprises three shelves 31 of the display case 30 on which dynamics objects (goods) are placed. The result of the computation of the ratio P/A is the maximum computing cost per volume unit, e.g. the maximum computing cost per cubic meter.

Alternatively, and still in reference to FIG. 4, the result of the computation of the ratio P/A of the location 40 may be the maximum computing cost per area unit e.g. per square meter. Because the location 40 is a volume, an area representing the volume of this location is computed. To this aim, a print 41 is extracted from the volume 40: this means that a projection of the volume 40 is performed on a projection plane (e.g. the ground 42 of the mall) following a direction, that is, the projection is constructed by linearly mapping points in 3D space to points on a two-dimensional projection plane. The print is thus an area. In FIG. 4, the direction of the projection is represented by the arrow 43 which is here perpendicular to the projection plane 42. The projection plane may be in this example the ground of the hallway 33. The print 41 is thus the result of a projection of the volume 40 on the projection plane 42.

Typically, the projection plane may be a plane extending across the 3D scene so that each location can be projected on this plane. Such a projection plane allows computing a maximum computing cost density when a mix of area and volume locations have been determined at step 110. In practice, all the locations (area or volume) are projected on the projection plane. In the example of FIG. 4, the 3D scene is a shopping mall wherein the ground of the shopping mall is a plane. In this case, the ground serves as a plane for determining location: area locations such as hallways of the mall are identified directly on the ground of the shopping mall, and prints of volume locations such as shelves are computed on the ground of the shopping mall.

The computing step 130 may be performed by running several batches of basic but significant scenarios that satisfy simulation in real-time to measure the computing resource performance of small homogeneous areas of a selection of typical locations in maximum computer resource cost situations.

Then, at step 132 of FIG. 1, it is performed a step of aggregating the computed maximum computing cost density of each location of the 3D scene. Aggregating means that the results of the computed maximum computing cost density of each location are joined (or gathered) together.

Next, at step 134 of FIG. 1, a map of cost density of the 3D scene is built from the aggregated maximum computing cost densities. The term map of cost density designates a representation of the computed maximum computing cost densities. This representation is typically done for a 2D plane that may be superimposed with the 3D scene, for instance the top view of the 3D scene. In other terms, the map of cost density is a representation of the maximum computing cost densities in correspondence with the 3D scene.

Interestingly, the map of cost density may be built on the same plane as the one projection plane on which locations may be projected. By this way, the correspondence between locations and computed maximum computing cost densities is more easily maintained. Furthermore, this advantageously makes easier the aggregating and building steps 132, 134 as a map of the 3D scene is pre-built as a result of the projections of the locations on the projection plane.

Once the map of cost density has been built, it may be displayed so that the user can see what area of the 3D scene requires what amount of computing resource. To this aim, the map may provide graphical information showing the computed maximum computing cost densities of a location of the 3D scene. For instance, a color scale may be used for representing maximum cost density.

Figure 5:
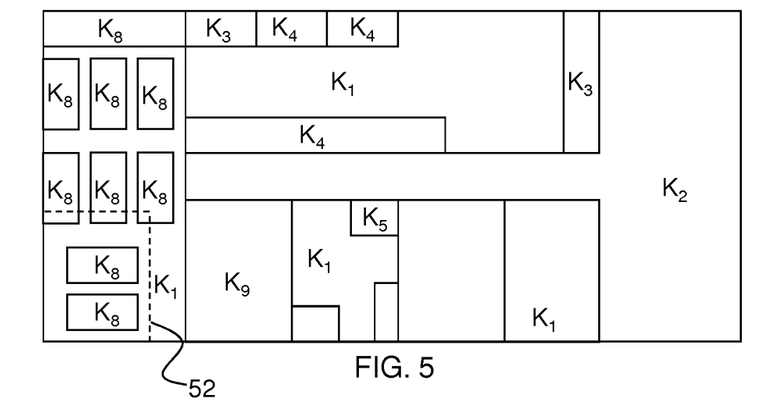
FIG. 5 shows an example of a map of cost density.

Referring now to FIG. 5, it is represented an example of a map of cost density of the 3D scene (the shopping mall) represented on FIG. 2. This map of cost density is obtained as a result of the computing, aggregating, and building steps 130, 132, and 134. The cost density map shown in FIG. 5 is a plane that can be superimposed with the 3D scene, e.g. the 3D scene of FIG. 2. In FIG. 5, the cost density map consists of the aggregation of cost density $K_i$ polygons (i is a natural number), each polygon $K_i$ representing a location for which a cost density has been computed. For example, the polygons $K_8$ approximately correspond to the locations of dynamics objects (goods places on shelves). As another example, polygons $K_1$ correspond to areas of the mall wherein the customers and their carts can move.

Interestingly, the map built from the aggregated maximum computing cost densities may be a plane that extends across the 3D scene, so that each location in the 3D be projected on this plane. Such a single projection plane allows computing a maximum computing cost density when a mix of areas and volumes locations have been determined at step 110.

At this step of the process depicted on FIG. 1, a map of cost density of a 3D scene has been built, as a result of the steps 120 to 134. It is now computed a second map, which is called map of constraints of the 3D scene, at steps 140-142. The building of the map of cost density and the map of constraints may be sequentially performed, or performed in parallel. For both maps, it is only required to provide a 3D scene comprising one or more objects (step 100) and to determine a set of locations in the 3D scene (step 110). Optionally, a scenario that is played on the 3D scene may be provided. The scenario may be provided in a similar way as the 3D scene.

At step 140, it is extracted, for each location of the 3D scene, static objects located on said each location. As seen previously, an static object is an object that cannot move in the 3D scene and that cannot be traversed by another object. The term extracting means that a computation is performed on the 3D scene for identifying static objects of the 3D scene. Thus, the extraction of static objects amounts to an identification of static objects. The identification of the static object may arise from the knowledge of the virtual world when it is designed.

Next, at step 142, a map of constraints of the 3D scene is built from the extracted static objects at step 140. The term map of constraints designates a representation of the static objects. This representation is typically done in a 2D plane that may be superimposed with the 3D scene, for instance the top view of the 3D scene.

The purpose of the map of constraints is to provide a graphical translation of practical rules for zones that will be grouped at step 160. These practical rules are intended to provide well shaped zones that depend on rules. For instance, a scope of rules may relate, but is not limited to, the geometry of the environment: indeed, as seen previously, the 3D scene may be contemplated as comprising a layout that can be modified for the purpose of specific scenarios, and the layout may comprise of static objects that cannot move in the 3D scene and that cannot be traversed by another object. In addition, other rules can manage other considerations than the geometry of the environment, for physics, engineering, and so on . . . .

As for the map of cost density, the map of constraints is typically a 2D plane that may be superimposed with the 3D scene, e.g. the top view of the 3D scene of FIG. 2. Because static objects are 3D objects, the step of extracting may further comprises that an extraction of a print of each static object on each location of the 3D scene. As explain previously in reference to FIG. 4, extracting a print of an object amounts to say that a projection of the object is performed on a projection plane according to a direction of projection so that a mapping from points in 3D space to points on a two-dimensional projection plane is performed.

The map of constraints may be built on the same plane as the one projection plane on which locations may be projected. By this way, the correspondence between locations and extracted static objects is more easily maintained. Once the map of cost density has been built, it may be displayed so that the user can see the constraints on a particular area of the 3D scene.

Figure 6:
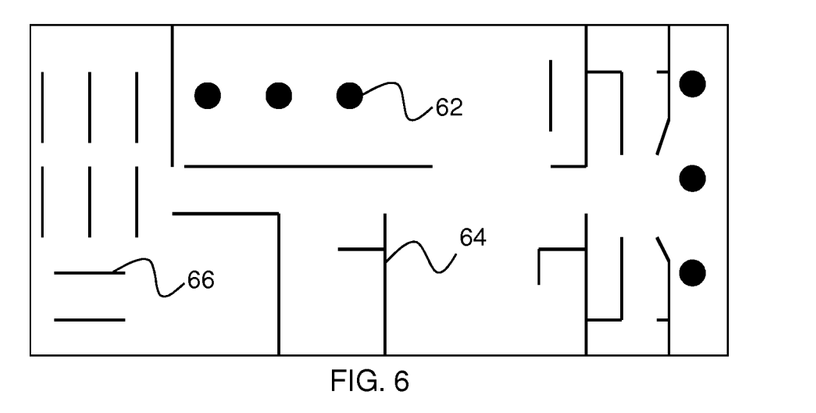
FIG. 6 shows an example of a map of constraints.

Referring now to FIG. 6, it is represented an example of a map of constraints of the 3D scene (the shopping mall) represented on FIG. 2. This map of constraints is obtained as a result of the extracting and building steps 140 and 142. Several static objects have been extracted from the 3D scene by extracting their prints, as illustrated for instance on FIG. 4. For instance, several supports 66 of display cases 30 have been extracted. Each support 66 is a static object that cannot be traversed by any other objects. As another example of static objects extracted from the 3D scene, piles 62 that support the roof of the shopping mall, partition wall 64 separating shops of the mall.

Interestingly, the shelves 31 attached to the supports 66 are also static objects; they cannot move in the 3D scene and cannot be traversed by any other objects. However, they are not extracted when building the map of constraints. Indeed, one or more dynamic objects may be potentially located on the shelves, as shown on FIG. 3 or 4, and when the prints of the shelves are extracted, that is, when a projection of the shelves 36 is done on the projection plane (here the ground 42), the projection of the potential one or more dynamic objects that is similarly performed as for shelves may recover, at least partially, the print of the shelves. And because the print of one or more dynamic objects is likely to recover at least partly the print of the static object, the shelves are not kept when building the map of constraints. In contrast, the prints of the supports 66, for which no dynamics object may be placed on, are kept.

The map of constraints may be a plane that extends across the 3D scene, so that each location in the 3D scene may be projected on this plane. Such a single projection plane allows to extract static objects when a mix of areas and volumes locations have been determined at step 110.

Back to FIG. 1, once the maps of cost density and constraints have been built, both maps may be aggregated at step 150. Aggregating the maps means that the maps are merged. The aggregation of the two maps may be carried out by superimposing the two maps. In particular, this operation may be more easily performed when both maps have the same scale. It is to be understood that the term scale refers to the ratio of a distance on the map to the corresponding distance on the 3D scene.

Next, at step 160, it is performed a grouping of adjacent locations into one or more zones. Locations are adjacent, that is, each location has at least one common point or one common border with another location of the zone. Alternatively, the step of grouping may involves that parts of adjacent locations are grouped into one or more zones. The step 160 thus consists in partitioning the virtual environment into one or more zones. For instance, and in reference to FIG. 5, each polygon $K_8$ represents a location and shares at least one edge with another polygon $K_1$. The zone 52 represented by the dotted lines comprises part of adjacent locations.

Each zone has a resulting computing maximum cost density guarantying a real-time performance of the zone. This means that the processing unit of the computerized system carrying out the present method is able to provide to the zone a computing resource that ensures a real time performance. The term real time performance means that it provided a guarantee response within strict time constraints.

The grouping is performed so that the resulting computing cost density of each zone is such that the computing resource required for processing the zone is under a predefined threshold. The resulting computing cost density of a zone is the sum of the maximum cost density of each location multiplied by its area. Said otherwise, the maximum computing cost of each location is computed by multiplying its area by its maximum cost density, and the results obtained for each location are summed. The predefined threshold may be a percentage of the processing unit of the computerized system carrying out the present method, or a percentage of the computing resource of the zone. In particular, the zones may be created so that they form zone called minimal zone, wherein a minimal zone is a zone for which its CPU cost sensibly equals 100% of its associated processing resource, in the maximum cost situation of the 3D scene. Preferably, the CPU cost is less than 100%, because of shape adjustment to fit constraints, for instance.

In addition, the grouping of location into one or more zones may be performed so that the resulting computing cost density between two or more zones is sensibly the same. This advantageously contributes to make easier the share of processing resources of the CPU between the zones. Especially, when the computerized system comprises two or more CPUs that provide the computing resources of the zones, the load between the CPUs is more easily shared.

Moreover, the grouping may further be performed by taking into account of the use of the computing resource made in the past by each zone. Indeed, the 3D scene is permanently running or processed by computing resources, and consequently, new dynamic and static objects may be continuously added, modified, or suppressed. Thus, and preferably, the method for partitioning a 3D scene may be regularly performed so that modifications of the 3D scene may be taken into account. For instance, the method may be performed again after a predetermined period of time has elapsed. Alternatively, the method for partitioning a 3D scene may be performed again after that one or more modifications of the 3D scene have been performed. Because the method of the present invention have been performed several times, it is possible to know the past uses of the computing resources of each zone, and thus to identify zones that use only a small part of the computing resource allocated to it. In practice, the computing resource allocated for processing the zone in accordance with the resulting computing cost density of the zone is lowered. This may be performed by lowering the predefined threshold.

Figure 7:
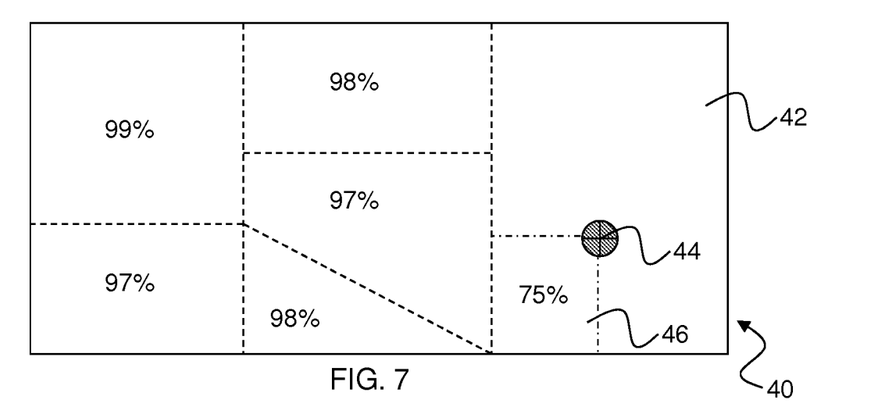
FIG. 7 shows an example of the aggregations of the maps of cost density and constraints of FIGS. 5 and 6.

The grouping may be performed upon user action, e.g. by interaction with a display on which locations of the 3D scene are shown. To this aim, a graphical editing tool may be provided to the user via the display, as shown on FIG. 7; the display is produced by superimposing the view of a zone partition editor with the map of constraints and with the map of cost density. When editing and drawing the shape of a zone 46, the user continuously receives the update on the resulting CPU cost of the zone (here 75%). The drawing of the zone amounts to perform a selection of an area on zone partition editor, and the selection may be carried out by the user via a haptic device such as a keyboard, a mouse, a stylus, or directly of the display, e.g. the display is a sensitive-touch screen. For instance, in a two-button mouse, the left button could be used for selecting an area while moving the cursor 44.

In addition, the user may be assisted to anchor definition points of the zone: the user's drawing can be steered or inhibited based on rules extracted from the map of constraints. For the shopping mall case represented on FIG. 2, such assistance will make a zone segments coincide with walls, or stay perpendicular to the closest shelf The user may be further assisted by one or more rules for editing zones, for instance, but not limited to:
- a zone cannot have a resulting computing cost density involving a computing cost that requires more than 100% of the processing unit of computerized system;
- a zone cannot be lumped;
- a zone has the least possible number of neighbour zones with crossable frontiers;
- a zone has the least length of crossable frontiers with neighbour zones;
- a zone has the most compact shape as possible.

The grouping may also be performed automatically upon computation by the system executing the method. This may be performed by using an optimization program, which can automatically generate a possible partition of the virtual environment into zones, which near as much as possible 100% of the CPU power of the computing resource.

The preferred embodiment of the present invention has been described. It will be understood that various modifications may be made without departing from the spirit and scope of the invention. Therefore, other implementations are within the scope of the following claims.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for partitioning a three-dimensional scene into a plurality of zones, each zone being processed by a computing resource, the method comprising:

providing a three-dimensional scene comprising one or more objects, each object generating a computing resource cost;

determining a set of locations in the three-dimensional scene;

filling each location of the determined set with a corresponding maximum occupancy of objects that reaches a respective most expensive computing cost;

computing, for each given location of the determined set, a maximum computing cost density, wherein the computing comprises computing a ratio P/A, and wherein P is a measured percentage of a computing resource required for processing the given location, and A is an area or a volume of the given location in the three-dimensional scene; and grouping adjacent locations into one or more zones, each zone having a resulting computing cost density guarantying a real-time performance of the respective zone, resulting in the three-dimensional scene being partitioned into the one or more zones.

2. The computer-implemented method of claim 1, further comprising the steps of:

aggregating the maximum computing cost densities computed for the locations of the determined set; and building a map of cost density of the three-dimensional scene from the aggregated maximum computing cost densities.

3. The computer-implemented method of claim 1, wherein the step of filling each location of the determined set with the corresponding maximum occupancy of objects is performed for dynamic objects, a dynamic object being an object that can potentially move in the three-dimensional scene.

4. The computer-implemented method of claim 1, further comprising the steps of:

extracting, for each location of the determined set, static objects located on said each location, a static object being an object that cannot move in the three-dimensional scene and that cannot be traversed by another object; and building a map of constraints of the three-dimensional scene from the extracted static objects.

5. The computer-implemented method of claim 4, wherein the step of extracting the static objects further comprises:

extracting, for each location of the determined set, a print of the static objects on said each location.

6. The computer-implemented method of claim 4, further comprising a step of:

aggregating the maps of cost density of the three-dimensional scene and the constraints of the three-dimensional scene.

7. The computer-implemented method of claim 1, wherein, at the step of grouping, the resulting computing cost density of each zone is such that the computing resource required for processing the respective zone is under a predefined threshold.

8. The computer-implemented method of claim 1, wherein, at the step of grouping, the resulting computing cost density between two or more zones is sensibly equivalent.

9. The computer-implemented method of claim 1, wherein the step of grouping is further performed taking into account a use of the computing resource made in the past by each zone.

10. A computer program product comprising:
a non-transitory computer readable storage medium, the computer readable storage medium having instructions configured to partition a three-dimensional scene into a plurality of zones, each zone being processed by a computing resource, by:
- providing a three-dimensional scene comprising one or more objects, each object generating a computing resource cost;
- determining a set of locations in the three-dimensional scene;
- filling each location of the determined set with a corresponding maximum occupancy of objects that reaches a respective most expensive computing cost;
- computing, for each given location of the determined set a maximum computing cost density, wherein the computing comprises computing a ratio P/A, and wherein P is a measured percentage of a computing resource required for processing the given location, and A is an area or a volume of the given location in the three-dimensional scene; and
- grouping adjacent locations into one or more zones, each zone having a resulting computing cost density guarantying a real-time performance of the respective zone, resulting in the three-dimensional scene being partitioned into the one or more zones.

11. A computerized system comprising:
a storage system configured in computer memory for storing a three-dimensional scene comprising one or more objects;
at least one processor coupled to the storage system, the at least one processor configured as a processing unit for processing a plurality of zones partitioning the three-dimensional scene, each zone being processed by a computing resource of the processing unit, the processing unit partitioning the three-dimensional scene into a plurality of zones by:
- providing a three-dimensional scene comprising one or more objects, each object generating a computing resource cost;
- determining a set of locations in the three-dimensional scene;
- filling each location of the determined set with a corresponding maximum occupancy of objects that reaches a respective most expensive computing cost;
- computing, for each given location of the determined set a maximum computing cost density, wherein the computing comprises computing a ratio P/A, and wherein P is a measured percentage of a computing resource required for processing the given location, and A is an area or a volume of the given location in the three-dimensional scene; and
- grouping adjacent locations into one or more zones, each zone having a resulting computing cost density guarantying a real-time performance of the respective zone, resulting in the three-dimensional scene being partitioned into the one or more zones.

12. The computerized system of claim 11, wherein the processing unit partitions the three-dimensional scene into a plurality of zones by further:
- aggregating the maximum computing cost densities computed for the locations of the determined set; and
- building a map of cost density of the three-dimensional scene from the aggregated maximum computing cost densities.

13. The computerized system of claim 11, wherein the processing unit performs the filling of each location of the determined set with the corresponding maximum occupancy of objects for dynamic objects, a dynamic object being an object that can potentially move in the three-dimensional scene.

14. The computerized system of claim 11, wherein the processing unit partitions the three-dimensional scene into a plurality of zones by further:
- extracting, for each location of the determined set, static objects located on said each location, a static object being an object that cannot move in the three-dimensional scene and that cannot be traversed by another object; and
- building a map of constraints of the three-dimensional scene from the extracted static objects.

15. The computerized system of claim 14, wherein the processing unit extracts the static objects by further:
- extracting, for each location of the determined set, a print of the static objects on said each location; and
- aggregating the maps of cost density of the three-dimensional scene and the constraints of the three-dimensional scene.

16. The computerized system of claim 11, wherein the resulting computing cost density of each zone is such that the computing resource required for processing the respective zone is under a predefined threshold.

17. The computerized system of claim 11, wherein the resulting computing cost density between two or more zones is sensibly equivalent.

18. The computerized system of claim 11, wherein the processing unit performs the grouping by taking into account a use of the computing resource made in the past by each zone.

* * * * *